United States Patent [19]

Leini

[11] Patent Number: 4,893,411

[45] Date of Patent: Jan. 16, 1990

[54] POWER SAWBLADES FOR ABRASIVE MATERIALS

[75] Inventor: Arvo Leini, Edsbyn, Sweden

[73] Assignee: Sandvik AB, Sandviken, Sweden

[21] Appl. No.: 272,334

[22] Filed: Nov. 17, 1988

[30] Foreign Application Priority Data

Nov. 23, 1987 [SE] Sweden .............................. 8704621

[51] Int. Cl.$^4$ .................. B27B 11/02; B27B 33/02
[52] U.S. Cl. ......................................... 30/369; 30/304; 30/355; 30/392; 83/751; 83/852
[58] Field of Search ................. 30/369, 392, 355, 304; 83/751, 749, 852, 846, 847, 848, 845, 851, 852, 845

[56] References Cited

U.S. PATENT DOCUMENTS

| 1,491,134 | 4/1924 | Northall | 30/369 |
| 1,537,980 | 5/1925 | Asselin | 30/392 |
| 2,596,078 | 5/1952 | Prohaska | 30/355 X |
| 2,659,969 | 11/1953 | Merkur | 30/369 |
| 2,840,125 | 6/1958 | Kirksey | 30/369 |
| 3,176,732 | 4/1965 | Henderson | 83/852 |
| 4,604,933 | 8/1986 | Lesher et al. | 83/851 |
| 4,784,034 | 11/1988 | Stones et al. | 83/751 X |

FOREIGN PATENT DOCUMENTS 2134038 8/1984 United Kingdom ................. 30/369

Primary Examiner—Frank T. Yost
Assistant Examiner—Rinaldi Rada
Attorney, Agent, or Firm—Burns, Doane, Swecker & Mathis

[57] ABSTRACT

Sawblades for cutting materials containing abrasive grains or fibers with a power saw utilizing two reciprocating sawblades in contact with each other guided by a groove in a guidebar, all teeth on one blade pointing forwards and all teeth on the other blade pointing backwards. The teeth are located with unequal distances chosen so that two teeth on the first blade will not simultaneously be opposite two teeth on the other blade with the same distance as the teeth on the first blade.

2 Claims, 1 Drawing Sheet

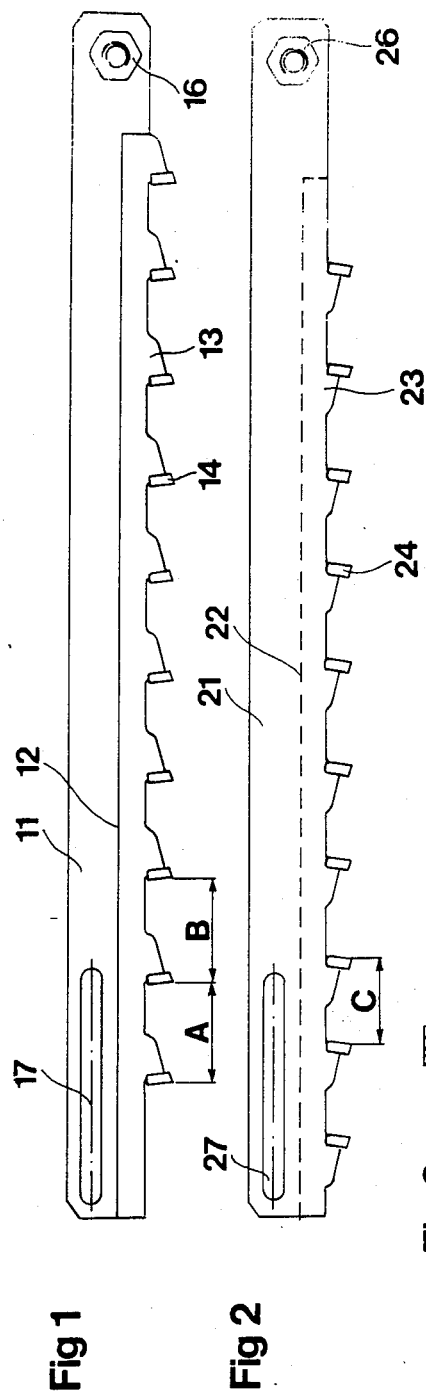
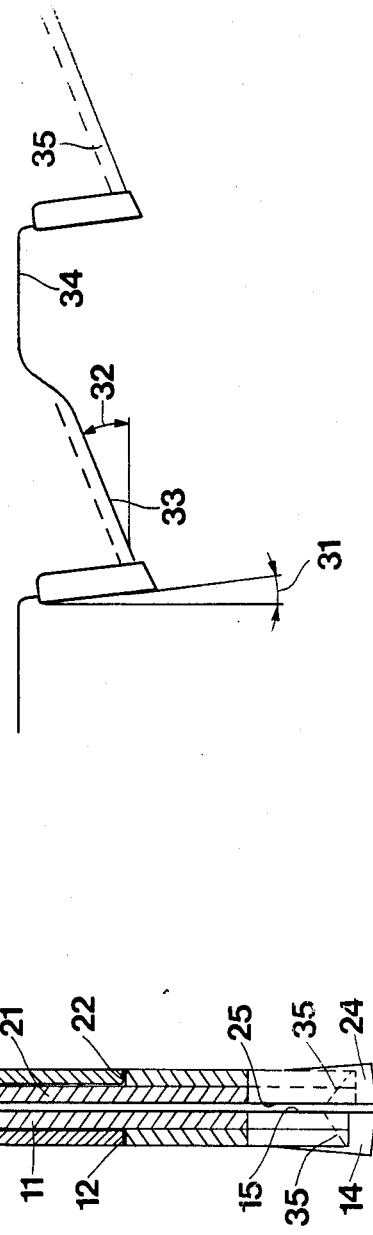
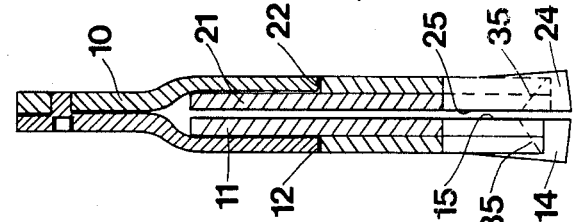
Fig 1
Fig 2
Fig 3
Fig 4

POWER SAWBLADES FOR ABRASIVE MATERIALS

BACKGROUND AND OBJECTS OF THE INVENTION

Power saws with two reciprocating blades moving in opposite directions in a groove in a guidebar powered by some driving means as electrical or gasoline engines are known long ago from among others the patents Northall U.S. Pat. No. 1,491,134 and Kirksey U.S. Pat. No. 2,840,136.

It is known from such designs to let the blades touch each other to make a narrow cut, and also to make at least the majority of teeth such that their setting does not let them cross or intersect the plane of contact between the two blades.

Various tooth shapes have been used, including symmetrical crosscutting teeth with beveled side edges and a sharp point as in U.S. Pat. No. 1,491,134 and drag or raker teeth with a main cutting edge at the tip as in Merkur U.S. Pat. No. 2,659,969. Various combinations of these are also known, as in U.S. Pat. No. 2,840,125 and Swedish Pat. No. 155,367.

The saws mentioned have mostly been intended for soft materials with fibrous structure, such as wood, meat or bread, where fragments of the sawn material getting caught between a pair of teeth moving in opposite directions are easily deformed or sheared without hindering the motion of the sawblades.

For sawing of material containing hard grains or fibers, such as porous concrete and fiber reinforced plastics, sawblades with these types of teeth are unsuitable, since they will only tend to loosen the grains or fibers from the sawn material, but are not efficient in shearing large grains or fibers which are still partly attached.

For the special case of cutting plaster casts used in surgery and incorporating layers of cotton gauze, it has been suggested in U.S. Pat. No. 2,659,969 to use taper ground blades provided with unset teeth with main cutting edges for the plaster and side cutting edges abutting the other blade to shear the cotton fibers between pairs of teeth moving in opposite directions.

If the grains or fibers are harder than in a plaster cast, each such shearing requires a large driving force, and if several grains or fibers are sheared simultaneously, the total force might stall or damage the driving means. This invention avoids overloading of the driving means by shaping and locating the teeth of the sawblades in such a manner that only one pair of teeth at a time is in a shearing position requiring a large driving force.

SUMMARY OF THE INVENTION

According to the invention the sawblades are made with all teeth pointing forwards on one blade and all backwards on the other. The teeth are unset and provided with cutting tips of harder material such as tungsten carbide or chromium-cobalt alloy, brazed or welded to a tooth base of steel. The sides of the tooth bases and tips facing the plane of contact are ground flat. Main cutting edges and at least part of the side cutting edges abutting the plane of contact are formed in the hard tip material. The main cutting edge has a rake angle close to zero, preferably negative 1 to 5 degrees, in order that grains or fibers caught between the side edges of a pair of teeth approaching each other during a first phase of the motion are held by friction until they are sheared, and subsequently pushed away. A slight negative rake angle will also improve the wear resistance of the main edge.

The non-cutting rear part of the teeth is reclined with a clearance angle of 20 to 45 degrees, in order that fibers or grains will be pushed away without sticking between the teeth when the cutting edges are moving reversely through the cut during a second phase of the motion. This effect is enhanced by beveling or chamfering the rear part of the teeth towards the plane of contact, which is also helpful in removing particles adhering to the kerf sides.

THE DRAWINGS

Two cooperating sawblades according to the invention are shown in FIGS. 1–2, and their cross-section in FIG. 3. FIG. 4 shows an enlarged lateral view of a toothed part of the sawblade of FIG. 1.

DETAILED DESCRIPTION OF A PREFERRED EMBODIMENT OF THE INVENTION

Each sawblade consists in its upper part of a thin guiding strip (11,21) with such a thickness that the guiding strips of both blades together can be received in a groove in a guide-bar (10). The lower parts of the sawblades are thicker, and at the transition to the thin guiding strips there are ledges (12,22) on which the feed pressure is transmitted from the guidebar to the sawblades. Saw tooth bases (13,23) are formed in the lower thicker part of the sawblades, where all teeth (13) of one blade are pointing forwards, and all teeth (23) of the other blade are pointing rearwards. The teeth are provided with cutting tips of harder material (14,24), which are welded or brazed to the tooth bases (13,23), whereafter teeth with cutting tips are ground flat on the sides (15,25) abutting the plane of contact between the blades.

The distances between neighboring teeth on each blade should be varied and chosen so that the distance A to the tooth in front is not the same as the distance B to the tooth behind, which leads to lesser vibrations and straighter cut. There is, however, no reason to place the teeth in recurring groups as is commonly done on bandsaws and bowsaws.

The same sequence of tooth distances should not be used for both blades. If two neighboring teeth with the distance C on one blade during different moments of the motion can stand opposite two neighboring teeth on the other blade with distance A or B, the distance C must be different from both A and B. The result is that two neighboring pairs of teeth (13,23) can not simultaneously be lined up, and the risk of overloading of the driving means is reduced.

In the rear end of the blades there are fastening devices to attach the blades to the driving means. The fastening devices can be made as threaded protrusions (16,26), angles, pins, and the like. In the front end of the guiding strips (11,21) there are arrangements to keep the blades from falling out of the groove of the guidebar (10), such as elongated slots (17,27), or pins.

FIG. 4 shows a tooth (13,23) in detail, where the negative rake angle (31) when sawing material containing hard grains or fibers should be chosen in the range from 1 to 10 degrees, preferably 1 to 5 degrees.

The clearance angle (32) measured on the clearance surface (33) of the teeth as well as the tips should lie in the range 20 to 45 degrees. The actual shape of the gullet (34) between the teeth is arbitrary, since it is normally not in contact with the sawn material, but can be made parallel to the guiding ledges (12,22) to give the blades a high and uniform stiffness. To lower the risk of particles getting caught between the clearance surfaces (33) of two teeth, these can be made with a chamfer (35).

I claim:

1. Sawblades for a power saw comprising a guidebar having a longitudinal groove in which the sawblades are reciprocally disposed, a first of the sawblades having forwardly facing first teeth and a second of the sawblades having rearwardly second facing teeth; each of said first and second teeth having a main cutting edge and a side cutting edge; the sawblades being mounted laterally adjacent one another within the groove for longitudinal reciprocation in opposite directions such that teeth on one sawblade become disposed laterally opposite teeth of the other sawblade so as to be disposed in cutting relationship therewith; a first distance from a selected first tooth to a preceding first tooth of said first sawblade being different than a second distance from said selected first tooth to a following first tooth on said first sawblade; a third distance from a selected second tooth to a preceding second tooth on said second sawblade being different than a fourth distance from said selected second tooth to a following second tooth on said second sawblade, said first, second, third and fourth distances being dimensioned such that no more than one tooth on either sawblade is in cutting relationship with a tooth of the other sawblade at any given instant.

2. Sawblades according to claim 1, wherein each of said first and second teeth comprises a base and a beveled clearance side, and a tip formed of a hard material bonded to the tooth base to formed of a hard material bonded to the tooth base to form the main cutting edge and at least a part of the side cutting edge.

* * * * *